C. B. GASSER.
POTATO PEELING MACHINE.
APPLICATION FILED JULY 25, 1917.
1,255,735.
Patented Feb. 5, 1918.
2 SHEETS—SHEET 1.
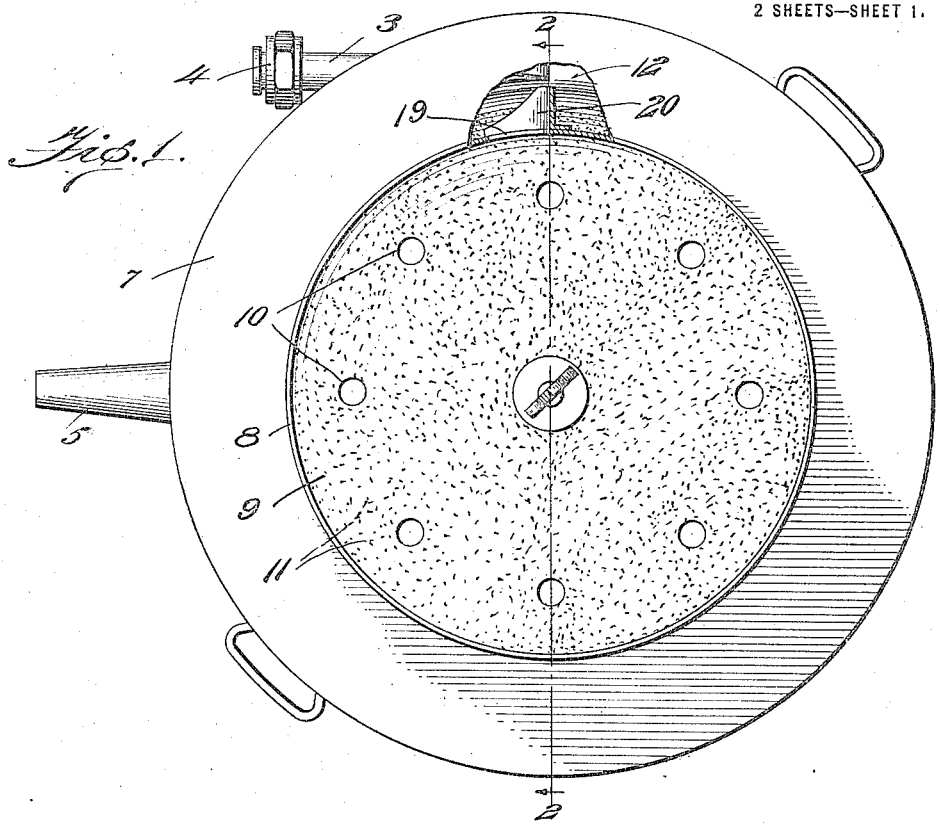
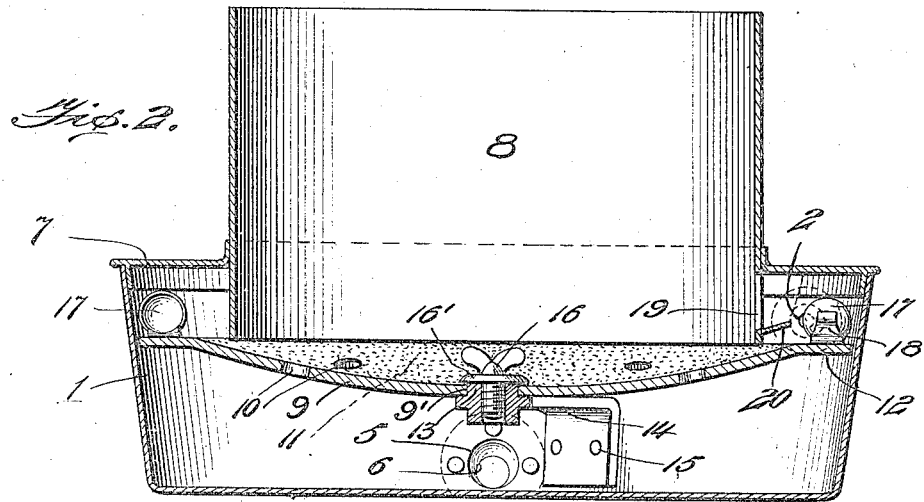

C. B. GASSER.
POTATO PEELING MACHINE.
APPLICATION FILED JULY 25, 1917.
1,255,735.
Patented Feb. 5, 1918.
2 SHEETS—SHEET 2.
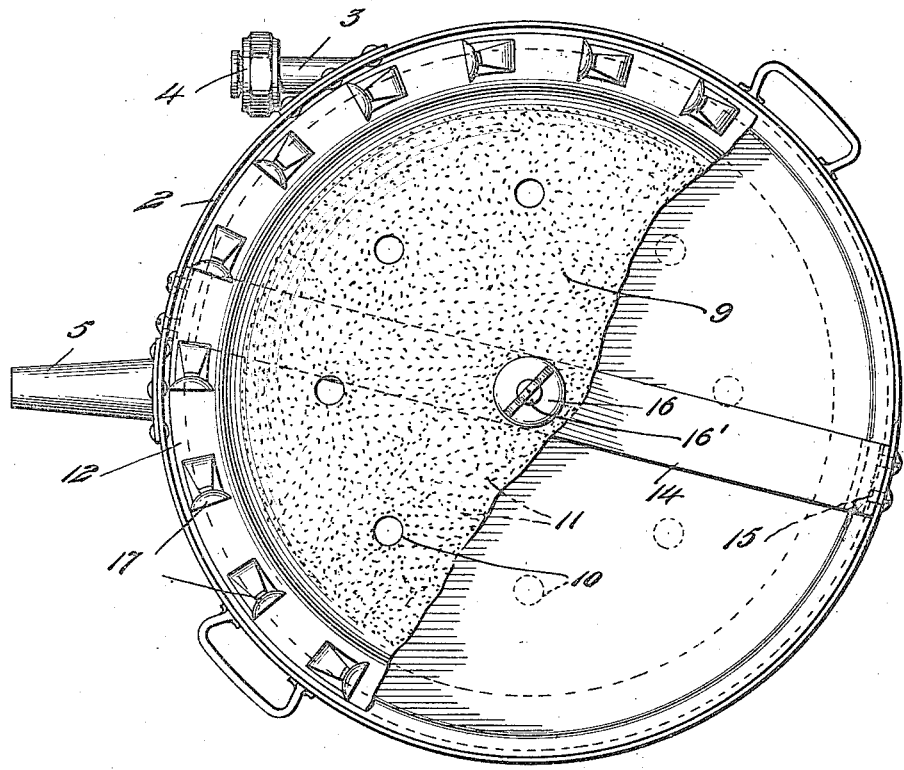
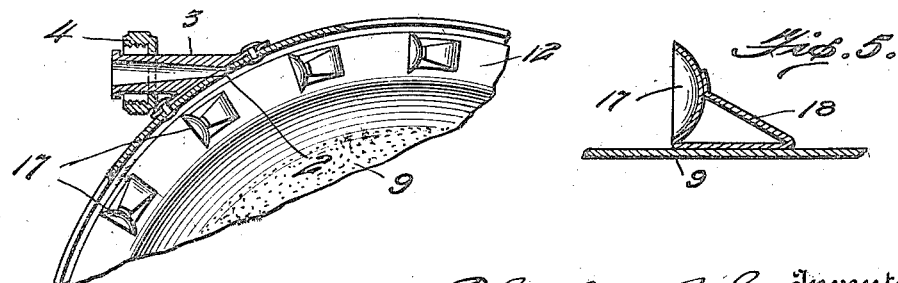

UNITED STATES PATENT OFFICE.

CHARLES B. GASSER, OF READING, PENNSYLVANIA.

POTATO-PEELING MACHINE.

1,255,735.

Specification of Letters Patent.

Patented Feb. 5, 1918.

Application filed July 25, 1917. Serial No. 182,709.

*To all whom it may concern:*

Be it known that I, CHARLES B. GASSER, a citizen of the United States, residing at Reading, in the county of Berks and State of Pennsylvania, have invented certain new and useful Improvements in Potato-Peeling Machines, of which the following is a specification.

My invention relates to improvements in potato peeling machines and one object is the provision of a machine which will rapidly remove the peel and at the same time clean the potato, and which will not waste any of the vegetable.

Another object of my invention is the provision of a machine of this character which will have a large capacity and which will rapidly and effectively remove only the outer coating or peeling of the potato.

Another object of my invention is the provision of a machine comprising few parts to insure simplicity, durability, cheapness and efficiency, and which will be practical and desirable from every point of view.

With these objects in view, my invention consists of a container, a rotary abrading peeling disk operated by the force of water, and a vessel to receive and deliver the potatoes to the action of the said disk to remove the peeling therefrom.

The invention further consists of a potato peeling machine embodying novel features of construction and combination of parts for service, substantially as shown, described and particularly defined by the claims.

In order that the construction in detail and the operation of my machine may be understood and its many advantages be appreciated, I have shown in the accompanying drawings a machine constructed according to my invention, it being understood that any changes may be made which fall within the scope of my claims.

Figure 1 represents a top plan view of my complete machine, partly broken away to disclose the relation of the water-supply pipe, the baffle plate and the contiguous water inlet upon the abrading disk.

Fig. 2 represents a sectional view taken on the line 2—2 of Fig. 1.

Fig. 3 represents a view partly in top plan and partly broken away, with the receiving vessel removed.

Fig. 4 represents a detail view showing the water inlet pipe and a portion of the disk with the cups thereon, against which the water contacts for rotating the disk, and Fig. 5 is a sectional view on an enlarged scale of one of the cups, showing its peculiar and novel construction.

Referring by numeral to the drawings, in which the same numerals of reference are employed to designate the same parts in all of the views:

The numeral 1 designates an outer receptacle or vessel of circular form and of the desired size, provided with a water inlet opening 2, near its upper edge, with which communicates the inlet pipe or nozzle 3, provided with a suitable coupling 4, for connection with a hose or water supply means, the vessel being further provided with the discharge opening 5, from which leads the discharge pipe 6.

Fitting upon the edge of this vessel is the collar 7, in which is mounted the container 8, of circular form, whose purpose is to receive and deliver the potatoes to the concaved disk 9, having perforations 10, and having the abrading surface 11, and further formed with the flat edge or rim 12.

The concaved abrading disk is formed with a central opening 9', which fits upon the perforated threaded hub 13, formed on the supporting bracket 14, secured at 15, to the outer receptacle, the disk being retained upon said hub, by the winged nut 16, this construction allowing the disk to revolve freely, also retaining the disk in its proper place and permitting it to be removed if found necessary, the said nut being formed with a flange 16' which prevents the disk working loose and serves to retain the disk in proper position.

Upon the flat rim of the disk are mounted a series of vertical cups 17, which receive the impact of the water from the inlet pipe, and these cups are formed with the flat metal angle-shaped braces 18, as shown in Fig. 5, which are suitably secured to the flat rim of the abrading disk, and the potato-containing vessel is provided with a water inlet 19, and with a baffle or angle-shaped plate 20, which directs the water into said opening and flushes and cleans the peelings from the potatoes as they are removed by contact with an abrading disk.

From the foregoing description, taken in connection with the drawings, the construction and operation of my machine will be readily understood, and it will be evident that the water supply is connected to the inlet pipe and the potatoes are placed in the receiving vessel and rest upon the abrading disk, the force of the water against the cups of the disk, causing the disk to rotate rapidly and by contact of said disk with the potatoes removing the peel without waste and in a rapid manner, the flow of water into the container flushing the potatoes and washing the peeling therefrom, wherewith the peeling and water is discharged from the receptacle through the discharge pipe, thus effectively removing the peeling and cleaning the potatoes at the one operation.

It is evident that I provide a machine which will quickly peel and wash the potatoes without wasting the vegetable; which machine will perform its work rapidly and thoroughly, and which can be manufactured at a price to make its use practical and desirable.

I claim:

1. A potato peeling machine, consisting of an outer receptacle provided with a water inlet and discharge, a rotary abrading peeling disk mounted in said receptacle, water impact receiving means carried by said disk to revolve the same and wash the material treated, and means for receiving and delivering the potatoes to said disk.

2. A potato peeling machine, consisting of an outer receptacle provided with a water inlet and discharge, a rotary concaved abrading disk mounted in said receptacle, water impact receiving means carried by said disk to revolve the same and effect the peeling and washing of the potatoes, and means for receiving and delivering the potatoes to said disk.

3. A potato peeling machine, consisting of an outer receptacle provided with a water inlet and discharge, a supporting bracket in said receptacle having a central perforated hub, a rotary abrading disk mounted on said hub, means for retaining said disk in place, water impact-receiving means carried by said disk to revolve the same and effect the peeling and washing of the potatoes, and a potato-receiving and delivering container communicating with said disk.

4. A potato peeling machine, consisting of an outer receptacle, an inlet and discharge for said receptacle, a potato container in said receptacle, having a water inlet and a baffle, a rotary abrading disk mounted in the receptacle, and water impact cups adapted to receive the force of the water from the inlet for rotating said disk, to effect the peeling and washing of the potato.

In testimony whereof I affix my signature in the presence of two witnesses.

CHARLES B. GASSER.

Witnesses:
EDWARD LANDIS,
ESTHER SCHLECHTS.

Copies of this patent may be obtained for five cents each, by addressing the "Commissioner of Patents, Washington, D. C."